(12) United States Patent
Wheeler

(10) Patent No.: US 10,291,563 B1
(45) Date of Patent: May 14, 2019

(54) MESSAGE ABUSE SENDER FEEDBACK LOOP

(71) Applicant: Amazon Technologies, Inc., Reno, NV (US)

(72) Inventor: Christopher A. Wheeler, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 638 days.

(21) Appl. No.: 13/664,084

(22) Filed: Oct. 30, 2012

(51) Int. Cl.
*H04L 12/58* (2006.01)
*H04L 29/06* (2006.01)

(52) U.S. Cl.
CPC .......... *H04L 51/12* (2013.01); *H04L 63/1425* (2013.01); *H04L 63/0227* (2013.01)

(58) Field of Classification Search
CPC ... H04L 51/12; H04L 12/585; H04L 63/0227; H04L 63/1441; H04L 63/0421; H04L 51/04; H04L 63/14
USPC ................................ 709/204, 206, 208, 224
See application file for complete search history.

(56) References Cited

U.S. PATENT DOCUMENTS

| | | | | |
|---|---|---|---|---|
| 7,962,510 B2* | 6/2011 | Najork | ............... | G06F 17/30864 707/708 |
| 8,141,152 B1* | 3/2012 | Hwang | ............... | H04L 63/0227 370/242 |
| 2004/0015554 A1* | 1/2004 | Wilson | .................. | G06Q 10/107 709/206 |
| 2004/0205135 A1* | 10/2004 | Hallam-Baker | ........ | H04L 51/12 709/206 |
| 2005/0044156 A1* | 2/2005 | Kaminski | ............... | H04L 51/12 709/206 |
| 2005/0114452 A1* | 5/2005 | Prakash | .................. | H04L 51/12 709/206 |
| 2006/0184500 A1* | 8/2006 | Najork | ............... | G06F 17/30864 |
| 2006/0265489 A1* | 11/2006 | Moore | ................ | H04L 67/1095 709/223 |
| 2007/0204033 A1* | 8/2007 | Bookbinder | ........... | G06Q 10/10 709/224 |
| 2008/0177841 A1* | 7/2008 | Sinn | ........................ | H04L 51/12 709/206 |
| 2009/0222527 A1* | 9/2009 | Arconati | .................. | G06F 21/31 709/206 |
| 2010/0076922 A1* | 3/2010 | Hariharan | ............... | H04L 51/12 706/52 |

(Continued)

OTHER PUBLICATIONS

Shafranovich et al., "An Extensible Format for Email Feedback Reports," Internet Engineering Task Force (IETF), RFC 5965, Aug. 2010, 1-25.

*Primary Examiner* — Edward Kim
(74) *Attorney, Agent, or Firm* — Baker & Hostetler LLP

(57) ABSTRACT

A request to send messages is received by a sender messaging service from a sender. The messages are for one or more recipients associated with one or more recipient messaging services. The sender messaging service can determine that at least one of the plurality of messages is indicative of message abuse. The sender messaging service can generate a warning message which includes at least one of an indication of the sender, an indication of an address of the sender, and an indication of the message abuse. The sender messaging service can send the warning message to the one or more recipient messaging services.

19 Claims, 6 Drawing Sheets

(56) References Cited

U.S. PATENT DOCUMENTS

| | | | | |
|---|---|---|---|---|
| 2010/0077040 A1* | 3/2010 | Hariharan | ............... | H04L 51/12 |
| | | | | 709/206 |
| 2010/0077043 A1* | 3/2010 | Ramarao | ................. | H04L 51/12 |
| | | | | 709/206 |
| 2011/0258218 A1* | 10/2011 | Hayes | .................... | G06Q 10/00 |
| | | | | 707/769 |
| 2012/0030293 A1* | 2/2012 | Bobotek | ................ | G06Q 10/10 |
| | | | | 709/206 |

* cited by examiner

MESSAGE ABUSE SENDER FEEDBACK LOOP

BACKGROUND

Unwanted electronic messages are an issue for many entities involved with messaging, such as message recipients, messaging service providers, and others. Recipients of abuse messages, such as spam email, phishing messages, and the like, typically do not want to receive abuse messages, abuse messages use up storage space in recipients' accounts or devices, and recipients typically have to take time to remove abuse messages from their accounts or devices. In addition, recipients' messaging service providers are burdened by abuse messages. Messaging service providers strive to provide enough messaging resources, such as email servers, to handle all of the messages being received by their messaging customers. As the number of incoming abuse messages increases, the need for providing additional messaging resources increases, which increases the costs of providing the messaging service. Similarly, the messaging service providers of those who send abuse messages are burdened by the need to send abuse messages. The cost to senders' messaging services increases as the number of abuse messages being sent from their services increases.

Some messaging service providers send abuse message feedback, in a process sometimes referred to as a feedback loop. When a message recipient indicates that a particular message is an abuse message, such as spam, junk, and the like, the recipient's messaging service can send a report back to the sender of the abuse message. This report, or feedback, can help services which have sent abuse messages to identify whether messages being sent from their services are abuse messages. For example, a business can send out an advertisement to a number of email recipients where the recipients use various email services. Some of the recipients' email services may send feedback to the business indicating the users and/or a percentage of users marked the business's email as junk email. The feedback information can help the business to remove users from their mailing lists, determine which types of promotional emails are appearing to user as junk email, and so forth. The Internet Engineering Task Force published RFC 5965 in August of 2010 seeking comments on an Abuse Reporting Fraud (ARF) standard for recipient email services to report email abuse.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

Figure 1:
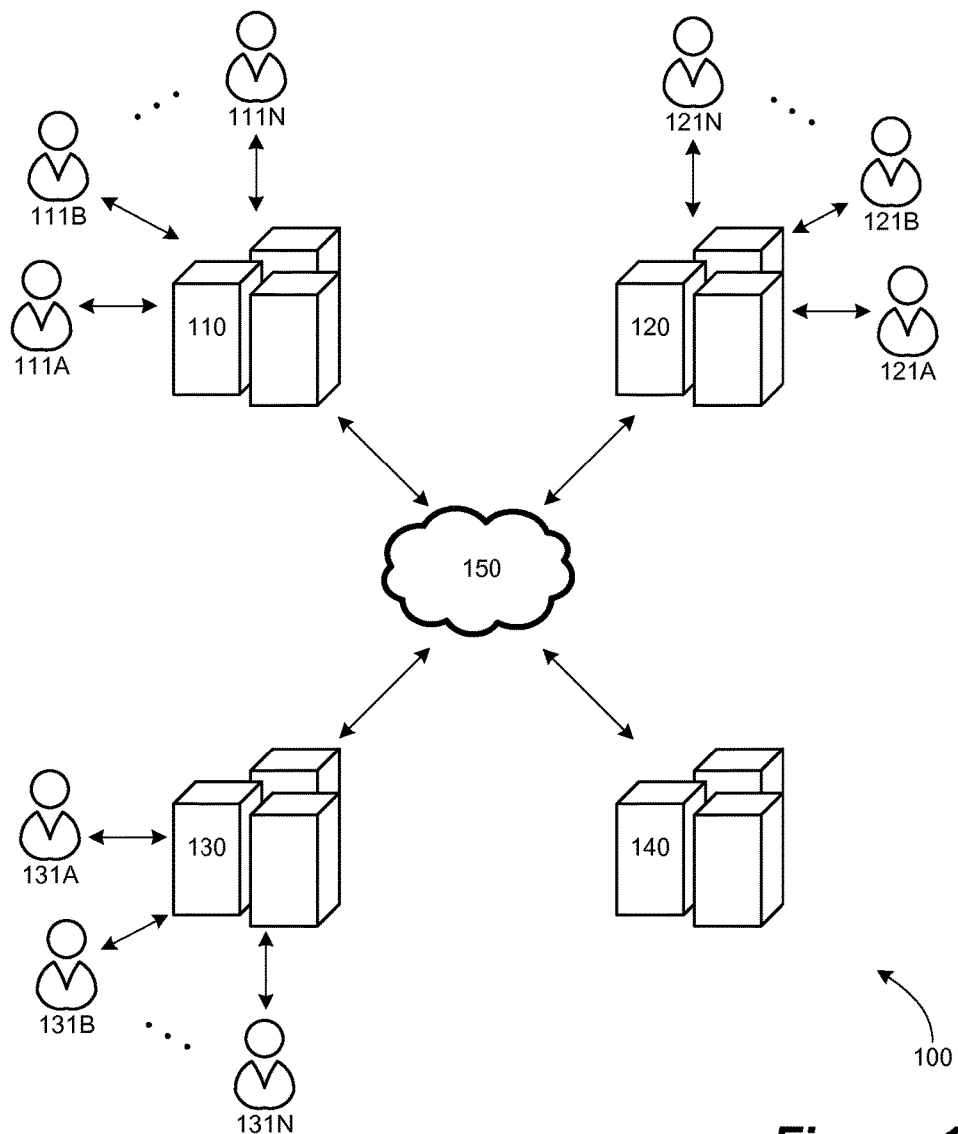
FIG. 1 depicts an embodiment of a messaging system.

Embodiments of systems and methods are described for email services to identify junk messages being sent through their messaging service. Upon receiving a request to send messages, sender messaging services, such as email services, text message services, third party messaging services, and the like, can determine whether the requested messages are indicative of message abuse. Message abuse can include spam messages, illegitimate messages, phishing messages, virus propagating messages, and the like. Spam messages can include identical or nearly identical messages sent to numerous message recipients. Illegitimate messages can include messages sent from one sender, but which appear to the recipient to be from a different sender. Phishing messages includes messages that attempt to gain information (such as usernames, passwords, credit card numbers, and the like) or money from the recipient by appearing to be requests from a trustworthy source, such as a bank.

After message abuse is identified by a sender messaging service, the sender messaging service can notify the intended recipient messaging service or services of the identified message abuse, of an identity or identities of the sender or senders, of actions that the sender messaging service may have taken, and the like. Any of the recipient messaging services can take additional actions, as appropriate, based on the information received from the sender messaging service. Sending notifications from a sender messaging service to recipient messaging services provides recipient messaging services with information about message abuse that can raise the sender messaging service's reputation among the recipient messaging services as striving to send only high quality messages. In addition, recipient messaging services may have limited information about the messages being sent by a single sender as a sender may send abuse messages to numerous recipient email services. Sending notifications from a sender messaging service to recipient messaging services provides recipient messaging services with information about message abuse that can be used by the recipient messaging service to information to identify and filter out abuse messages received from other sender messaging services.

Messaging services can include email messaging services, text messaging services, instant messaging services and the like. Email messaging services exchange digital messages, often send from a sender email account to one or more recipient email accounts over one or more computer networks. Email messages can include a message envelope, a message header, and a message body. Email message headers may contain control information, such as a sender's email address and one or more recipient email addresses, and other information such as a subject, a time and date stamp, and the like. Text messaging services exchange text messages, typically brief messages, between two or more devices over a network, such as a phone network. Devices used to send text messages can include mobile phones, portable devices, or other computing devices. In the past, text messages have contained only textual language, but text messages can also include multimedia information, such as pictures and videos. Instant messaging services allow users to communicate via instantaneous or near instantaneous messages over a network. Instant messages may be between one sender and one recipient, or among a group of senders and recipients. Instant messages are typically pushed to recipients and appear automatically on a recipient's computing device. Instant messages can contain text, video, images, and other multimedia content.

Depicted in FIG. 1 is an example embodiment of a messaging system. Messaging system 100 includes a number of messaging services 110, 120, 130, and 140 connected via a network 150. Each of messaging services 110, 120, 130, and 140 can be an email messaging service, a text messaging service, an instant messaging service, a third party messaging service, and any other type of messaging service. Email messaging services can include personal email services, such as web-based personal email services, and member-based email services, such as email services for employees of a business, members of professional organizations, and the like. Text messaging services can include cellular telecommunication companies, satellite telecommunication companies, providers of mobile devices, and the like. Instant messaging services can include any service that provides instant communication between users or user devices, such as social media services. Third party messaging services include services that send messages on behalf of other parties, such as services that allow third parties to provide a list of recipient addresses and message content to the third party service and the third party service sends the message content in messages to the recipient addressed on the list. Each of messaging services 110, 120, 130, and 140 can include one or more computing devices, such as servers, storage memory, processors, communication mechanisms, and the like. Network 150 can be any type of network or combination of networks, including the Internet, a local area network, a wide area network, a cellular communication network, a social network, and the like.

Messaging services can service individual users and allow individual users to communicate with each other by way of the messaging service infrastructure as further described herein. As depicted in the embodiment in FIG. 1, messaging service 110 can provide messaging services for individual users 111A, 111B, . . . , 111N; messaging service 120 can provide messaging services for individual users 121A, 121B, . . . , 121N; and messaging service 130 can provide messaging services for individual users 131A, 131B, . . . , 131N. For example, messaging service 110 could be an email messaging service which provides individual email accounts for each of individual users 111A, 111B, . . . , 111N. In another example, messaging service 110 could be a telecommunication company that provides text messaging capabilities for each of individual users 111A, 111B, . . . , 111N. A number of other example messaging services exist for individual users. Individual users of a single messaging services, such as individual users 111 of messaging service 110, can have a relationship with each other, such as employees of an employer messaging service. Individual users of a single messaging services can also have no discernible relationship with one another, such as users of a web-based email service (e.g., YAHOO!MAIL, HOTMAIL®, etc).

Third party messaging services can service third party requests to send messages. For example, a company that operates a retail store may want to send promotional materials to its customers, but it may not want to maintain its own messaging service. In such a case, the company that operates the retail store may send a request to a third party messaging service to send a message about the promotion to each of the customers on a customer list. Such a request can include a request to send email messages to customer email addresses, text messages to customer phone numbers, and/or instant messages to customer instant message handles. The third party messaging service can prepare and send messages to the customers on the customer list using the content provided by the third party. As depicted in the embodiment in FIG. 1, messaging service 140 can be a third party messaging provider. For example, messaging service 140 can allow third parties, such as individuals and businesses, to provide a list of message recipients and message content to messaging service 140. Messaging service 140 can generate messages for the message recipients based on the message content provided by the third parties. Messaging service 140 can then send those messages to the message recipients. Using third party messaging services can alleviate the need for a third party from having to establish and maintain complex and costly messaging systems. Each of messaging service 110, 120, and 130 can also operate as a third party messaging service in addition to servicing individual users, as depicted in FIG. 1.

Figure 2:
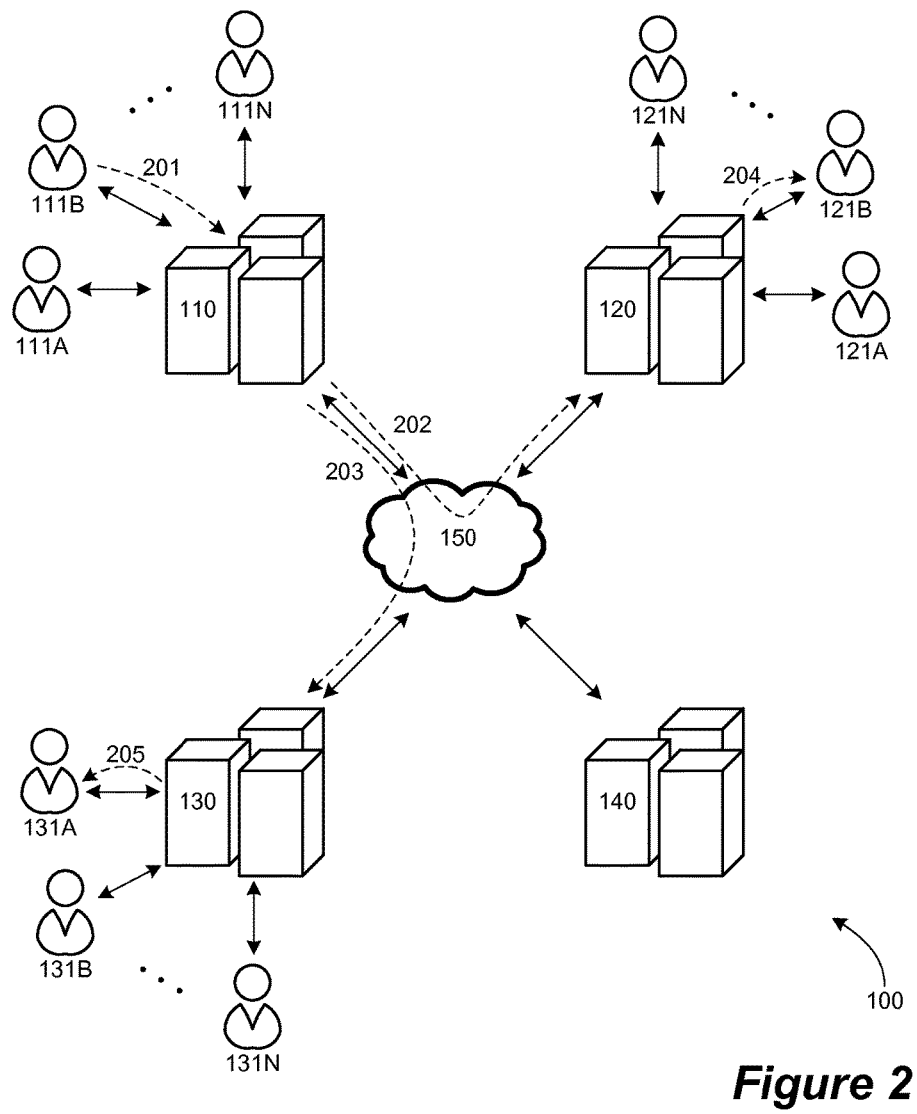
FIG. 2 depicts an embodiment of sending messages from a sender messaging service to recipient messaging services.

Messages can be sent via multiple messaging services. For example, in the embodiment depicted in FIG. 2, user 111B may want to send a message to user 121B and to user 131A. In such a case, user 111B can create the message using a computing device, such as a personal computer, a tablet computer a laptop computer, a cell phone, a handheld device, and the like. User 111B can create the message using functionality locally on a computing device, such as a text message generation application on a cell phone, or interactively with a service provided by messaging service 110, such as a web-based email client system. The message created by user 111B can include an indication of a destination associated with user 121B and a destination associated with user 131A, such as a cell phone number, an email address, an instant message handle, and the like. User 111B can send request 201 that the created message be sent by messaging service 110. In this particular example, messaging service 110 is a sender messaging service. Sender messaging service 110 sends the messages 202 and 203 via network 150 to messaging service 120 and messaging service 130, respectively. In this particular example, each of messaging service 120 and messaging service 130 is a recipient messaging service. Recipient messaging services 120 and 130 can route and deliver messages 204 and 205 to user 121B and user 131A, respectively.

Figure 3:
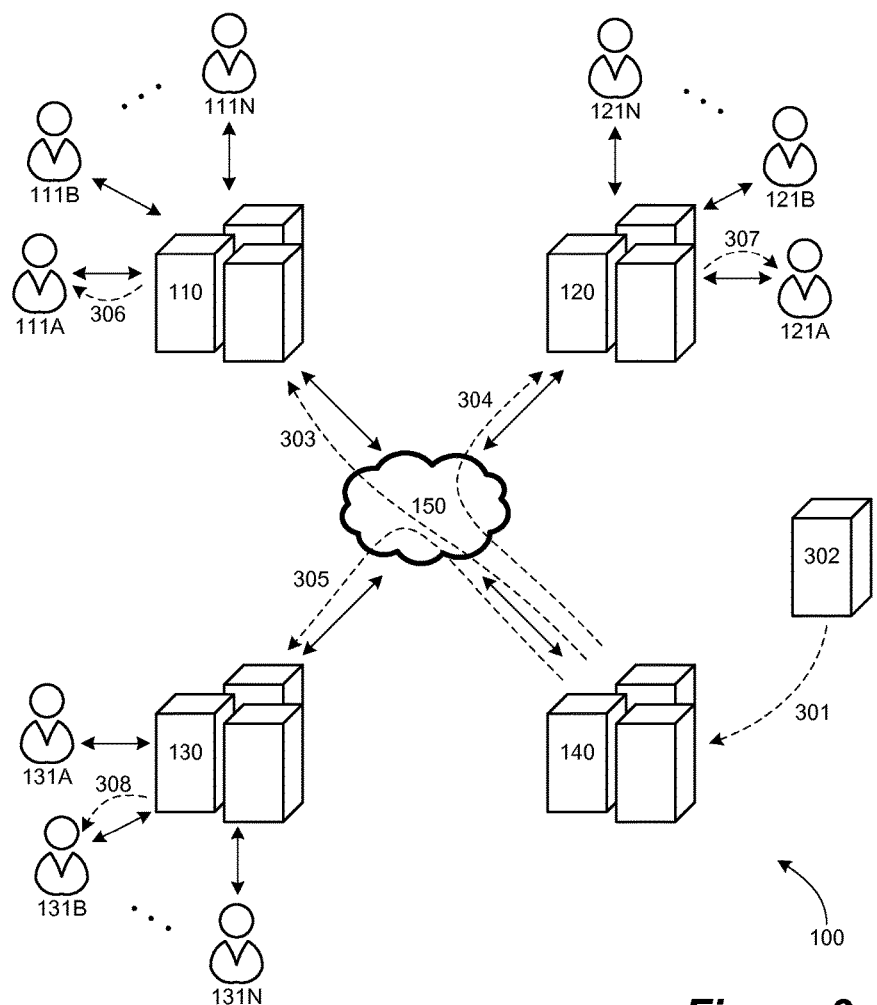
FIG. 3 depicts an embodiment of sending messages from a third party sender messaging service to recipient messaging services.

In another example depicted in FIG. 3, messaging service 140 can be a third party messaging service which receives a request 301 from a third party 302 to send a message to each of users 111A, 121A, and 131B. The third party 302 can be an individual, a group, a company, or any other third party. In one embodiment, the request 301 can include messages created by third party 302, such as messages created locally using a computing device or interactively with messaging service 140. In another embodiment, the request 301 can also include a list of the recipients 111A, 121A, and 131B and an indication of the content for the messages. In this embodiment, the messaging service 140 may be configured to create messages for each of the listed recipients based on the indication of the content for the messages. Whatever the form of the request 301, messaging service 140 can create messages 303, 304, and 305 based on the request 301 from the third party 302. Messaging service 140 can send the messages 303, 304, and 305 to each of messaging services 110, 120, and 130, respectively, via network 150. In this particular example, messaging service 140 is a sender messaging service and each of messaging services 110, 120, and 130 is a recipient messaging service. After receiving the messages 303, 304, and 305 sent by sender messaging service 140, recipient messaging services 110, 120, and 130 can route and deliver messages 306, 307, and 308 to users 111A, 121A, and 131B, respectively.

Figure 4:
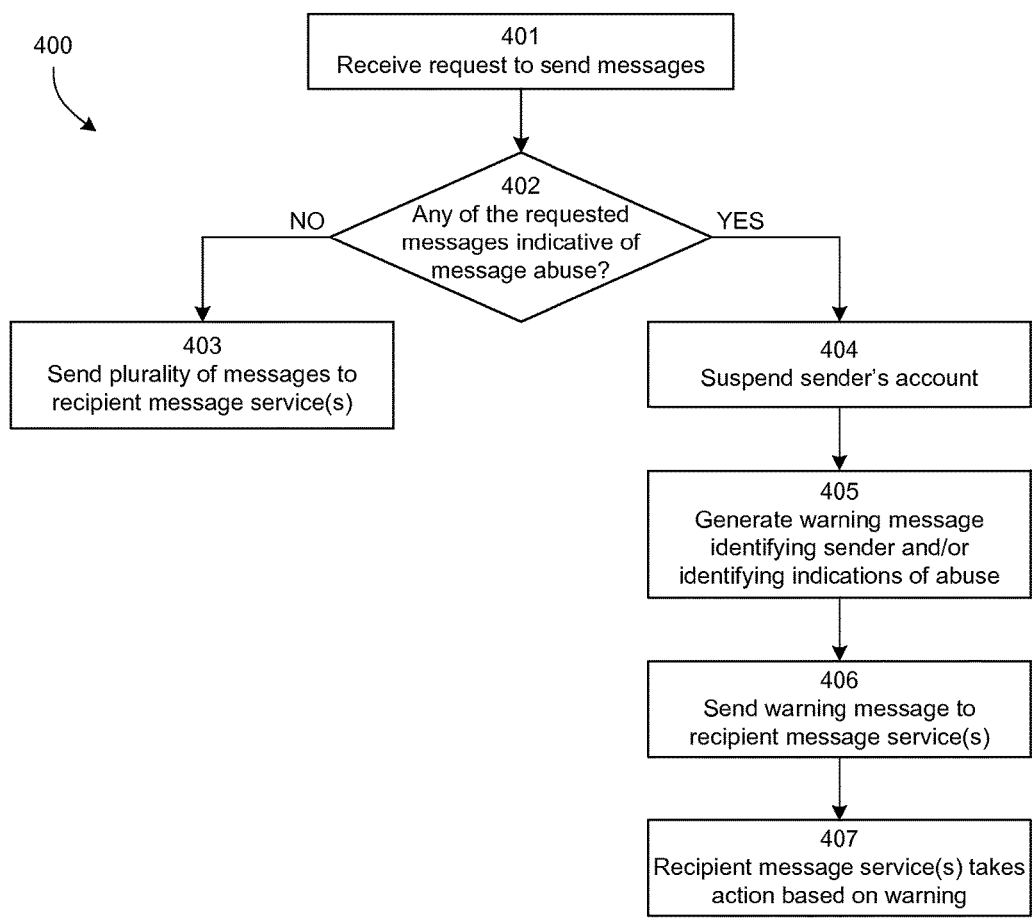
FIG. 4 depicts an embodiment of a method for a sender messaging service to identify and enforce detected message abuse.

Depicted in FIG. 4 is an example method for a sender messaging service to handle a request to send messages. Sender messaging service can receive 401 a request to send messages. The request to send messages can come from a third party, from one individual user, from a number of users, or any other combination. After receiving 401 the request, the sender messaging service can determine 402 whether any of the requested messages are indicative of message abuse, such as spam messages, illegitimate messages, phishing messages, virus propagating messages, and the like. The determination 402 as to whether any of the messages are indicative of message abuse can be based on any of the following types of information or any combination thereof.

Information about previously-undeliverable messages can indicate that a request to send messages is indicative of message abuse. In an example where the current request is to send email messages, the sender messaging service may be aware of that messages previously sent to certain recipient email addresses have been returned as undeliverable. The sender messaging service may identify those email addresses as potentially fake email addresses. Fake email addresses may include addressed addresses generated by the sender that are not actual email addresses, including email addresses to a domain that does not provide email services, email addresses to accounts that do not exist, and the like. If the current request includes a request that email messages be sent to some or a large number of the potentially fake email addresses, the sender messaging service may identify the request as indicative of message abuse. When identifying potentially fake email addresses, it may be helpful for the sender messaging service to differentiate between hard bounces and soft bounces when email messages are returned as undeliverable. Hard bounces occur when an email message is permanently undeliverable, such as when the recipient address or domain is invalid, the recipient has blocked email messages from a particular sender, and the like. Soft bounces occur when an email message is temporarily undeliverable, such as when the recipient's mailbox is full, the recipient's email account has reached a daily maximum for the number of emails that can be received, the recipient messaging service is temporarily unavailable, the email message is too large, and the like. Hard bounces may be more indicative of a fake email address, though soft bounces may also be indicative of a fake email address.

Senders can also use fake addresses in a text messaging or other messaging service. For example, where the current request is to send text messages, the sender messaging service may be aware of phone numbers or mobile devices that are unable to receive text messages based on previous attempts to send text messages to those phone numbers or mobile devices. In addition, the sender messaging service may be aware of phone numbers that are unassigned or no longer in service. If the current request includes a request that text messages be sent to some or a large number of phone numbers or mobile devices that cannot receive text messages, the sender messaging service may identify the request as indicative of message abuse. In addition, if requests are received to send the same or similar text messages to a large number of recipients, the sender messaging service may identify the request as indicative of message abuse. In general, any time messages are returned as undeliverable, a sender messaging service may use that information to determine whether subsequent requests to send messages are indicative of message abuse.

Information about previous complaints from message recipients can indicate that a request to send messages is indicative of message abuse. As noted above, in the context of email messages, recipient email services can report feedback information to sending email services reporting whether senders have identified certain email messages as junk email messages. Feedback information could also include information about whether a recipient read email messages, deleted email messages without reading them, blocked a particular sender, and the like. Feedback information can also be supplied in other messaging settings, such as text messaging and instant messaging. Based on any feedback information available, a sender messaging service may identify certain features about messages, such as particular senders, content, and the like, that is indicative of messaging abuse. When a sender messaging service receives a request to send messages, the sender messaging service messaging service can analyze the requested messages based on the feedback information to determine whether any of the requested messages are indicative of message abuse.

Information about the content of requested messages can indicate that a request to send messages is indicative of message abuse. Sender messaging services can parse requested messages to determine whether the content is similar to known message abuse practices. Parsing requested messages can include identifying particular words or phrases that are typically associated with email abuse. Parsing requested messages can include identifying a ratio of markup language, such as HTML, XML, and the like, to text. Higher ratios of markup language to text may be indicative of messages that are more likely to be viewed as junk or spam messages. Parsing requested messages can include identifying a number of links within the messages. The gross number of links in any may be indicative of message abuse and a number of links compared to the length of the message may also be indicative of message abuse. Parsing requested messages can include making a deep inspection of links in the message by visiting the links in the message. If a link within a message redirects to a different location, the redirecting link may be indicative of message abuse, such as phishing. Parsing requested messages can include identifying patterns of content within the messages that are indicative of message abuse. Certain patterns of content, such as combinations of particular words or phrases in text, a particular link or links, an attachment or attachments, and the like, may be indicative of message abuse.

Information about the volume of requested messages from a particular sender can indicate that a request to send messages is indicative of message abuse. For example, if a particular sender has been fairly idle with respect to sending requests for messages and suddenly sends a request or requests for a high volume of messages, the sudden change in volume may be indicative of message abuse. Similarly, if a particular sender recently obtained an account, such as by signing up for an email account, purchasing a cell phone with text capabilities, or signing up for a third party sender servicer, and begins requesting a large volume of messages to be sent, the large volume of messages from a new user can indicate message abuse. When the sender messaging service is a third party messaging service, tracking volumes of requests from users can aid in identifying anomalies in volumes of individual user requests.

Information in headers of requested messages can indicate that a request to send messages is indicative of message abuse. For example, some types of messages have standards defining specific headers, such as the SMTP standard for email messages. Standard email headers can include fields such as "from," "to," "cc," "subject," "date," and the like. Information in these standard header fields can be used by messaging services to route messages to a recipient messaging account. A request for sending messages may include information identifying standard message headers. Proper or accepted usage of standard headers may indicate that a request to send messages is not related to message abuse. However, some uses of standard headers, such as trying to obscure or mask the sender's domain name, may be indicative of message abuse. A request for sending email messages may include information in a raw message format, such as raw email. In such cases, a sender messaging service may simply send the requested messages in the raw message format without processing the request in any way. However, parsing the raw message format information to identify the headers may allow the sender messaging service to identify whether the use of the headers is indicative of message abuse. In addition, messages can include non-standard headers, sometimes referred to as X-headers. When a recipient messaging service receives an email with X-headers, it can use any X-headers that it recognizes and ignore any X-headers that is does not recognize. Senders of abuse messages may attempt to include an X-header in messages indicating that the message is not related to message abuse, such as "X-spam:no". At first glance, this X-header appears to be telling a recipient messaging service that the message is not spam. However, this X-header may actually not be recognized by any recipient messaging service and spam senders may include the X-header merely in an attempt to have the message not flagged as spam. The inclusion of such an X-header in a message may be indicative that the message is related to message abuse.

Information about files and attachments included with requested messages can indicate that a request to send messages is indicative of message abuse. Some file types, such as ".exe" and ".zip", have been used in abuse messages, such as an effort to deliver malicious software to recipients' computing devices. If a request to send messages includes an attachment with a suspicious file type, the sender messaging service may identify the requested messages as indicative of message abuse. In one embodiment, any message with an attached ".exe" file would be indicative of message abuse. Other messages may include embedded files, such as images, which can be displayed with the message. However, embedded files in messages may also be indicative of message abuse. An alternative to embedding files in messages is to embed a link to a file, such as an image accessible via the Internet, which can be downloaded when the message is to be viewed. In addition to examining embedded files, a sender messaging service may also inspect links to files that are embedded within messages to determine whether the messages are indicative of message abuse.

Information about the intended recipients of the requested messages can indicate that a request to send messages is indicative of message abuse. Some senders of abuse messages will send a large number of messages to recipient accounts under the senders' control. When the messages are received by the accounts under the senders' control, the senders will not flag the messages as abuse messages, such as spam or junk. In such cases, any feedback loop information would indicate that only a small number of message recipients marked the sender's messages as abuse messages. However, a sender messaging device can identify patterns in the intended recipients of the requested messages that may indicate that the sender is attempting to send the requested messages to accounts under the sender's control. In one example using email messages, the sender may request that messages be sent to a list of email addresses, such as abcde1@domain.com, abcde2@domain.com, . . . , abcdeN@domain.com. The pattern of recipient addresses may indicate that the sender created the accounts using a series of available addresses. Identifying such a pattern in the list of intended recipients may indicated message abuse as the sender may appear to be gaming the feedback loop system.

Referring back to FIG. 4, the sender messaging service can decide 402 whether any of the requested messages relate to message abuse. The decision 402 can be based on any item of information noted above and any combination of the items of information noted above. If some or all of the requested messages are not indicative of message abuse, the sender messaging service can send 403 the requested messages to the appropriate recipient messaging service or services. If any of the request messages are indicative of message abuse, the sender messaging service can suspend 404 the sender's account. Suspending 404 the sender's account can include notifying the sender that the account has been suspended or informing the sender that the requested messages that are indicative of message abuse will not be delivered. Informing the sender that the message was indicative of message abuse can aid legitimate senders in revising their requested messages so that their messages will be of higher quality and less likely to be deemed to be indicative of message abuse. The sender messaging service can also generate 405 a warning message. The warning message can include an identification of the sender or an identification of the indicated message abuse. The warning message could also include a sample message that was deemed to be indicative of message abuse. After generating 405 the warning message, the sender messaging service can send 406 the warning message to the recipient messaging service or services of the intended recipients. After receiving the warning message, the recipient messaging service or services can take 407 action based on the warning.

The actions that can be taken by a recipient messaging service can be based on the specific information in the warning message. For example, the warning message can include an IP address associated with the sender. The recipient messaging service can review all messages incoming from that IP address or possibly block all incoming messages from that IP address. One tactic of message abuse senders is to send message from multiple sender messaging services. If recipient messaging services monitor all messages sent from the sender's IP address, the recipient messaging service can ensure that other messages sent from that IP address via different sender messaging services can be reviewed for message abuse. The recipient messaging service can also ensure that the IP address cannot be used to create accounts at the recipient messaging service. In another example, a warning message can include an indication of the reason or reasons that the sender messaging service found the requested message to be indicative of message abuse. For example, the warning message could indicate the information, such as intended recipients, previous recipient complaints, content of the requested messages, sender volume changes, suspicious headers, embedded or linked files, attachments, or other information, that caused the sender messaging service to flag the requested messages as being indicative of message abuse. Whatever information caused the sender messaging server to identify requested messages as indicative of message abuse could also be used by the recipient messaging service to identify similar information in messages received from other sender messaging services.

Figure 5:
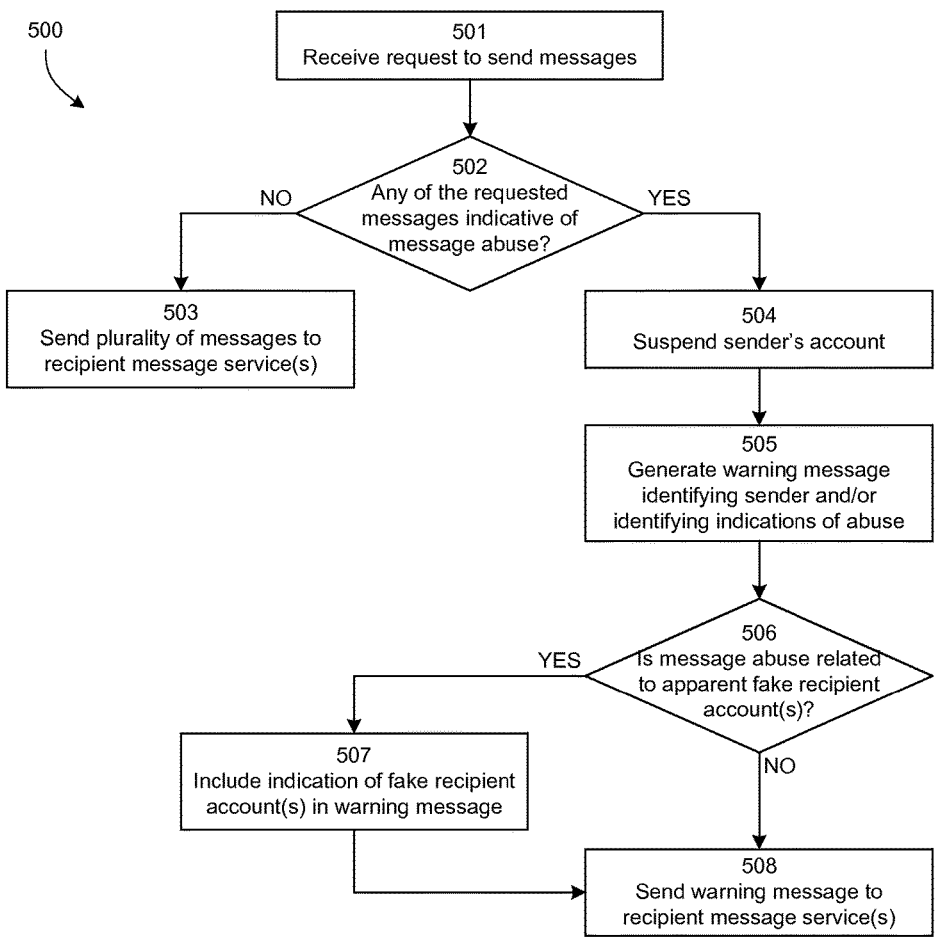
FIG. 5 depicts an embodiment of a method for a sender messaging service to identify message abuse system gaming and enforce detected message abuse.

Depicted in FIG. 5 is an example method for a sender messaging service to handle a request to send messages. The sender messaging service can receive 501 a request to send messages. After receiving the request, the sender messaging service can determine 502 whether any of the requested messages are indicative of message abuse. The decision 502 can be based on any item of information noted above and any combination of the items of information noted above among other indicators. If some or all of the requested messages are not indicative of message abuse, the sender messaging service will send 503 the requested messages to the appropriate recipient messaging service or services. If any of the request messages are indicative of message abuse, the sender messaging service may suspend 504 the sender's account. Suspending 504 the sender's account can include notifying the sender that the account has been suspended or informing the sender that the requested messages that are indicative of message abuse will not be delivered. The sender messaging service can also generate 505 a warning message. The warning message can include an identification of the sender or an identification of the indicated message abuse. The warning message could also include a sample message that was deemed to be indicative of message abuse. After generating 505 the warning message, the sender messaging service can determine 506 whether any of the indicated message abuse relates to one or more apparent fake recipient accounts. Apparent fake recipient accounts can be those that appear to not actually be actual accounts, such as accounts for which hard bounces have previously been received. Apparent fake recipient message accounts can also be those that appear to be under the control of the sender. If the indicated message abuse relates to one or more apparent fake recipient accounts, the sender messaging service can include 507 an indication of those apparent fake recipient accounts in the warning message. If the sender messaging service determines 506 that the indicated message abuse does not relate to one or more apparent fake recipient accounts, or if the sender messaging service includes 507 an indication of those apparent fake recipient accounts in the warning message, the sender messaging service can send 508 the warning message to the recipient messaging service or services of the intended recipients. The recipient messaging service or services can take any action based on the received warning message. In the example where the warning message includes an indication of fake recipient accounts, a recipient messaging service can take action to disable the accounts.

Figure 6:
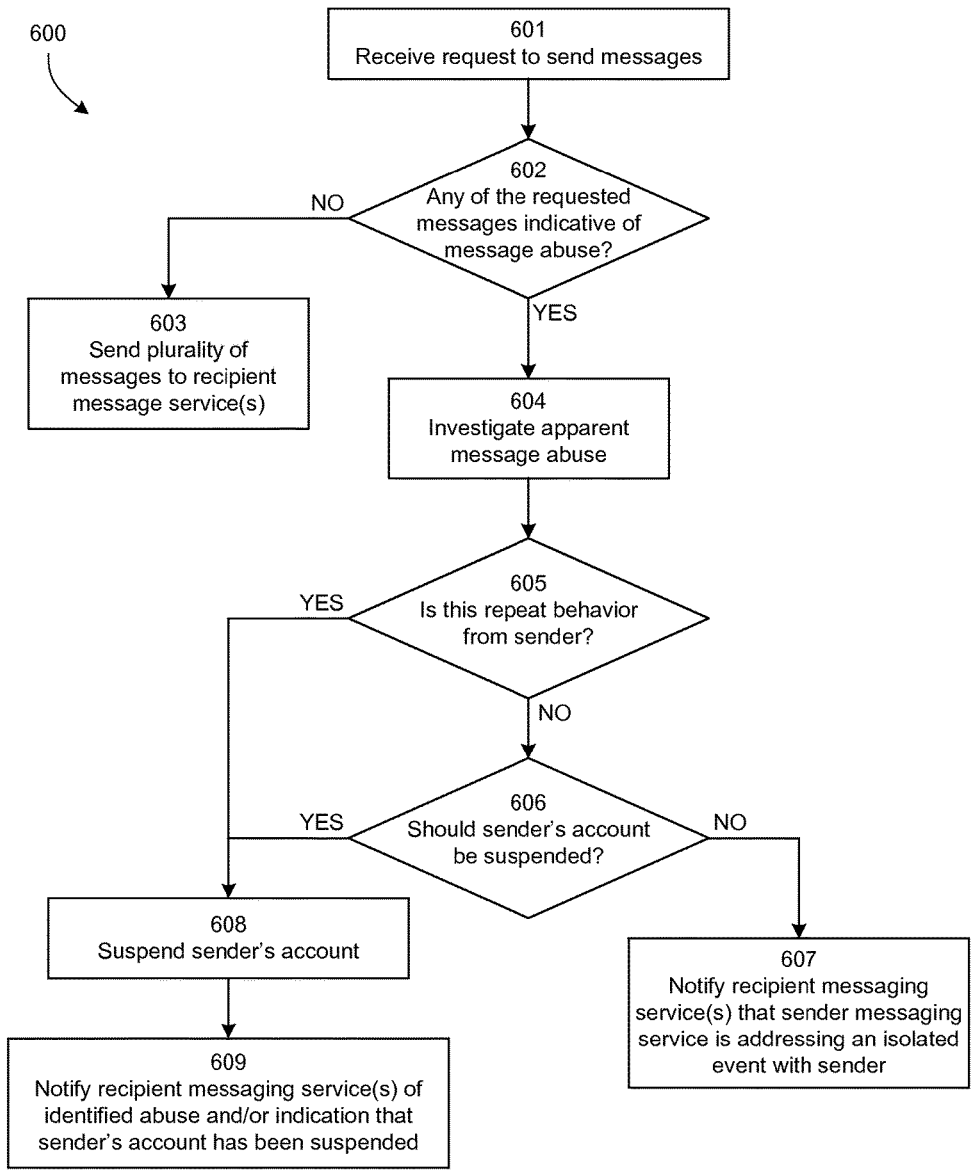
FIG. 6 depicts an embodiment of a method for a sender messaging service to identify message abuse and warn recipient messaging services.

Depicted in FIG. 6 is an example method for a sender messaging service to handle a request to send messages. The sender messaging service can receive 601 a request to send messages. After receiving the request, the sender messaging service can determine 602 whether any of the requested messages relate to message abuse. The decision 602 can be based on any item of information noted above and any combination of the items of information noted above. If some or all of the requested messages are not indicative of message abuse, the sender messaging service can send 603 the requested messages to the appropriate recipient messaging service or services. If any of the request messages are indicative of message abuse, the sender messaging service can investigate 604 the apparent message abuse. As part of the investigation, the sender messaging service can determine 605 whether the apparent message abuse is repeat behavior or the apparent message abuse was an isolated incident, such as a disgruntled employee, a broken database, an error in the list of intended recipients, and the like. If the sender messaging service determines 605 that the apparent message abuse is not repeat behavior, the sender messaging service can determine 606 whether the sender's account should be suspended. An isolated event from an otherwise reputable sender may not warrant immediate suspension of the sender's account. However, in other situations, such as when a new user requests a high volume of messages to be sent, the first incident of apparent message abuse may warrant immediate suspension of the sender's account. If the sender messaging service determines 606 that the sender's account should not be suspended, the sender messaging service can notify 607 one or more recipient messaging services that the sender messaging service is addressing an isolated event with the sender. If the sender messaging service determines 605 that the apparent message abuse is repeat behavior, or if the sender messaging service determines 606 that the sender's account should be suspended, the sender messaging service can suspend 608 the user's account. After suspending 608 the sender messaging service can notify 609 the one or more recipient messaging services that the apparent message abuse was identified and that the sender's account has been suspended.

Sending notifications from a sender messaging service to recipient messaging services when message abuse is detected and handled can be beneficial in a number of ways. In one aspect, many users of messaging services want their messaging service to filter out abuse messages, such as spam, phishing, and the like, while delivering all messages that are not abuse messages. When recipient messaging services have information about message abuse identified by one sender messaging service, the recipient messaging services will be able to use that information to identify and filter out abuse messages received from other sender messaging services. In another aspect, sender messaging services may want to have a good reputation of sending only high quality messages. When a sender messaging service notifies recipient messaging services of identified message abuse, it can raise the sender messaging service's reputation among the recipient messaging services as striving to send only high quality messages.

Notifications from sender messaging services to recipient messaging services can be sent in a number of ways. In one embodiment, the sender messaging services can send a report to the recipient messaging service which is formatted specifically to report identified message abuse. Such a report could include an example message or messages that were identified as indicative of message abuse. In another embodiment, the sender messaging service can post a notification to subscription service to which the recipient messaging service is subscribed. For example, the sender messaging service can post the notification to a feed, such as an RSS feed, to which the recipient messaging service is subscribed. In another example, the sender messaging service can use a subscription service which delivers messages to recipient messaging services over the recipient messaging services' protocol of choice (e.g., HTTP, email, SMS, etc). Such a subscription service can push such messages to recipient messaging services rather than requiring recipient messaging services to poll for new messages.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A method for handling requests to send a plurality of messages, the method comprising:
   receiving, by the sending message service, from a sender associated with a messaging account associated with a sending messaging service, a request to send a plurality of messages to one or more of a plurality recipient accounts associated with one or more recipient messaging services;
   detecting, by the sending message service message abuse associated with at least one of the plurality of messages is associated with the messaging account;
   generating, by the sending message service, a warning message, wherein the warning message comprises an indication of the message abuse; and
   sending, by the sending message service, the warning message to the one or more recipient messaging services for use by the one or more recipient messaging services to filter out messages from the sending messaging service, wherein the sending messaging service and the recipient messaging service are associated with different entities, wherein the warning message comprising an indication of message abuse is formatted to identify message abuse so that the recipient messaging service can filter out message abuse.

2. The method of claim 1, wherein the warning message comprises at least one of an indication of the sender associated with a messaging account or an indication of an address of the sender.

3. The method of claim 1, wherein detecting message abuse comprises:
   determining that one or more messages previously sent to one of the one or more recipient accounts was previously returned as undeliverable.

4. The method of claim 1, wherein detecting message abuse comprises:
   determining that a message previously sent from the messaging account to a recipient account was marked by a recipient associated with the recipient account as a spam message or a junk message.

5. The method of claim 1, wherein detecting message abuse comprises:
   determining that a message previously sent from the messaging account to a recipient account was marked by a messaging service associated with the recipient account as a spam message or a junk message.

6. The method of claim 1, wherein detecting message abuse comprises:
   determining that a message previously sent from the messaging account to a recipient account and that a recipient associated with the recipient account blocked the messaging account from sending subsequent messages.

7. The method of claim 2, wherein detecting message abuse comprises:
   determining that content in the plurality of messages is indicative of message abuse.

8. The method of claim 7, wherein detecting message abuse comprises:
   parsing content of one or more of the plurality of messages; and
   determining a ratio of markup language to text in the content of the one or more of the plurality of messages.

9. The method of claim 7, wherein detecting message abuse comprises:
   parsing content of one or more of the plurality of messages; and
   identifying a number of links within the content of the one or more of the plurality of messages.

10. The method of claim 2, wherein detecting message abuse is based on a volume of messages requested by the sender associated with the messaging account.

11. The method of claim 2, wherein detecting message abuse is based on one or more headers of at least one of the plurality of messages.

12. The method of claim 2, wherein detecting message abuse is based on at least one of an attached file, an embedded file, or a linked file in at least one of the plurality of messages.

13. The method of claim 2, wherein the warning message comprises an indication of an IP address of the sender.

14. The method of claim 2, further comprising:
   suspending an account of the sender.

15. The method of claim 1, wherein sending the warning message to the one or more recipient messaging services comprises posting a notification to a subscription service to which the recipient messaging service is subscribed.

16. A non-transitory computer-readable storage medium having stored thereon computer readable instructions, the computer-readable instructions comprising instructions that upon execution on one or more computing devices, at least cause:
   receiving, by the sending message service, from a sender associated with a messaging account associated with a sending messing service, a request to send a plurality of messages to one or more of a plurality of recipient accounts associated with one or more recipient messaging services;
   detecting, by the sending message service, based on the one or more recipient accounts, message abuse associated with at least one of the plurality of messages associated with the messaging account;
   generating, by the sending messaging service, a warning message, wherein the warning message comprises an indication of the message abuse; and
   sending, by the sending message service, the warning message to the one or more recipient messaging services for use by the one or more recipient messaging services to filter out messages from the sending messaging service, wherein the warning message comprising an indication of message abuse is formatted to identify message abuse so that the recipient messaging service can filter out message abuse and wherein the sending messaging service and the recipient messaging service are associated with different entities.

17. The computer-readable storage medium of claim 16 further comprising computer-readable instructions that upon execution on the one of more computing devices, at least cause:
   determining that at least one of the one or more recipient accounts appears to be under control of the sender.

18. The computer-readable storage medium of claim 17 further comprising computer-readable instructions that upon execution on the one of more computing devices, at least cause:
   including, in the notification, an indication of the at least one of the one or more recipient accounts that appear to be under control of the sender.

19. The computer-readable storage medium of claim 17 wherein determining that at least one of the one or more recipient accounts appear to be under control of the sender comprises recognizing a pattern in the at least one of the one or more recipient accounts.

* * * * *